(No Model.)
J. F. LAVINE.
HORSE TAIL HOLDER.
No. 509,816. Patented Nov. 28, 1893.
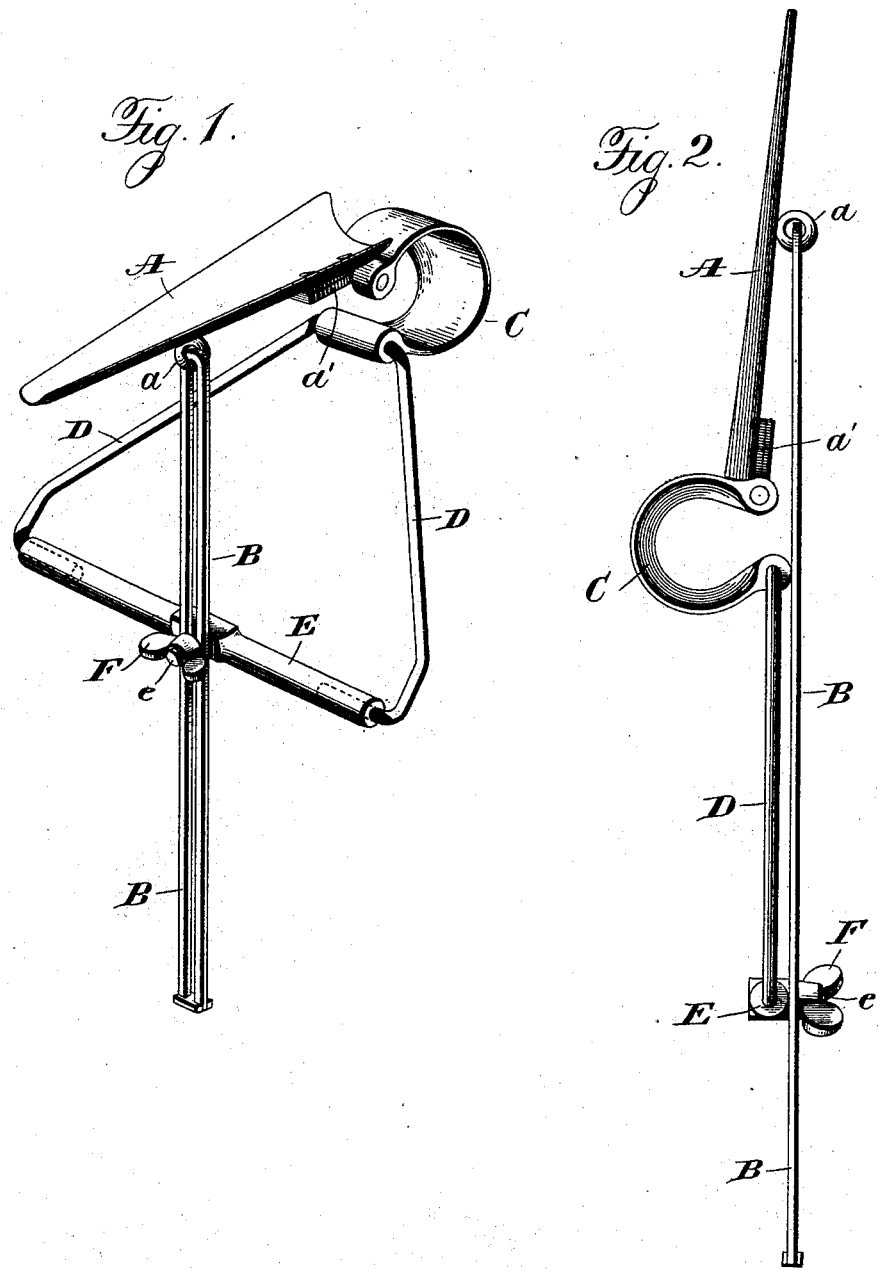
Witnesses:
Jas. E. Hutchinson
Chas. J. Williamson
Inventor:
Joseph F. Lavine, by
Crindle & Russell, his Attys

UNITED STATES PATENT OFFICE.

JOSEPH F. LAVINE, OF GREENBURG, NEW YORK.

HORSE-TAIL HOLDER.

SPECIFICATION forming part of Letters Patent No. 509,816, dated November 28, 1893.

Application filed September 16, 1893. Serial No. 485,653. (No model.)

*To all whom it may concern:*

Be it known that I, JOSEPH F. LAVINE, a citizen of the United States of America, residing in the town of Greenburg, in the county of Westchester, and in the State of New York, have invented certain new and useful Improvements in Horse-Tail Holders; and I do hereby declare that the following is a full, clear, and exact description thereof, reference being had to the accompanying drawings, in which—

Figure 1 is a perspective view of my device; Fig. 2 a side view of the same shown as folded.

Letters of like name and kind refer to like parts in both figures.

The design of my invention is to provide a convenient and simple device or appliance to support or hold the tail of a horse while the same is being trimmed, and to this end, said invention consists, in the holder or support, constructed, substantially as and for the purpose hereinafter specified.

In carrying my invention into practice I provide a plate A to receive and support the horse's tail, which as shown, is made concave or dished to most readily engage and confine the latter and has a length substantially equal to the fleshy portion of the tail. Near its center said plate is pivotally connected by an eye or ring $a$ on its under side, to the upper end of a slotted bar B, while at one of its ends it is pivoted or hinged to one end of a curved, C-shaped plate C, by means of a lug or projection $a'$ attached to its under side and extending a short distance beyond such end. The other end of the plate C is pivotally connected to the upper portion of a rod or bar D, that from said end on both sides thereof extends downward and outward, and has its ends bent inward to enter sockets or openings in the opposite ends of a horizontal bar E, and thus pivotally unite the latter and said rod. These two, it will be observed form a triangular shaped frame. At its longitudinal center the bar E has a threaded stud or screw $e$ attached to it which passes through the slot in the bar B, and by means of a thumb nut F enables the two to be clamped together at any desired point along the length of the bar B.

To apply my invention to a horse, the crupper is passed through the curved plate C, and the triangular frame composed of the bars D and E allowed to rest against the horse's rump. By fixing the bar E at different points along the bar B, it will be seen that the tail holding plate A can be adjusted to stand at different angles of inclination.

My device answers perfectly the purpose for which it is designed. It is light in weight and can very quickly and easily be applied to and removed from the horse.

When not in use the holder can be compactly folded or closed as shown in Fig. 2, so as to take up but little space.

Having thus described my invention, what I claim is—

1. In a holder or support for the tails of horses, the combination of the tail receiving portion, the bar connected to and extending downward from the latter the plate or part attached to said portion and adapted for connection with the crupper and the frame to rest against the horse extending from said plate or part to and connected with said bar, substantially as and for the purpose specified.

2. In a holder or support for the tails of horses, the combination of the tail receiving portion, the bar connected to and extending downward from the latter, the crupper engaging plate or part attached to said portion, and the frame to rest against the horse, extending from said plate to and connected adjustably with said bar, substantially as and for the purpose shown.

3. In a holder or support for the tails of horses, the combination of the tail receiving plate, a bar connected to the latter, a curved, crupper engaging plate connected pivotally to the tail receiving plate, and the triangular frame, also pivotally connected to the crupper engaging plate, and extending to and adjustably connected with the bar, substantially as and for the purpose described.

In testimony that I claim the foregoing I have hereunto set my hand this 12th day of September, 1893.

JOSEPH F. LAVINE.

Witnesses:
DICKINSON W. RICHARDS,
JOHN MCLAUGHLIN.